US008365739B1

(12) United States Patent
Jones

(10) Patent No.: US 8,365,739 B1
(45) Date of Patent: *Feb. 5, 2013

(54) DEVICE FOR POSITIONING THE SITTING PATIENT FOR EPIDURAL OR SPINAL INJECTION PROCEDURES

(76) Inventor: Robert Kevin Jones, San Clemente, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/902,096

(22) Filed: Oct. 11, 2010

Related U.S. Application Data

(63) Continuation-in-part of application No. 12/586,815, filed on Sep. 29, 2009, now abandoned.

(51) Int. Cl.

| | |
|---|---|
| ***A61G 15/00*** | (2006.01) |
| ***A47B 7/00*** | (2006.01) |
| ***A47B 23/00*** | (2006.01) |
| ***A47B 9/00*** | (2006.01) |
| ***A47B 9/20*** | (2006.01) |
| ***A47B 13/02*** | (2006.01) |
| ***A47C 17/86*** | (2006.01) |
| ***A47C 20/02*** | (2006.01) |
| ***A47C 20/04*** | (2006.01) |
| ***A47F 3/14*** | (2006.01) |
| ***A47F 5/00*** | (2006.01) |
| ***A47J 47/00*** | (2006.01) |

(52) U.S. Cl. .................... 128/845; 5/624; 5/648; 5/651; 108/49; 108/106; 108/147; 108/147.19; 108/147.21; 108/150; 211/126.2; 211/126.5; 211/133.1; 211/133.3; 211/134; 211/187; 248/121; 248/122.1; 248/129; 297/172; 297/188.2; 297/188.21

(58) Field of Classification Search .................. 128/845; 5/624, 648, 651; 297/217.3, 172, 188.2, 297/188.21; 248/448, 161, 121, 122.1, 129; 108/96, 106, 150, 49, 147.19, 147.21, 147; 211/126.2, 126.5, 133.1, 133.3, 133.4, 134, 211/187

See application file for complete search history.

(56) References Cited

U.S. PATENT DOCUMENTS

| | | | | |
|---|---|---|---|---|
| 228,518 | A * | 6/1880 | Dawes | 108/147 |
| 3,853,297 | A * | 12/1974 | Drolet | 248/412 |
| 6,182,663 | B1 * | 2/2001 | Madden | 128/845 |
| 6,662,392 | B2 * | 12/2003 | Heimbrock | 5/621 |
| 6,959,962 | B2 * | 11/2005 | Dixon | 297/195.11 |
| 7,104,201 | B2 * | 9/2006 | Comeaux et al. | 108/90 |

* cited by examiner

*Primary Examiner* — Michael Brown
*Assistant Examiner* — Brandon L Jackson
(74) *Attorney, Agent, or Firm* — Risso & Associates; Marcus Risso

(57) ABSTRACT

A patient support device for use in patients undergoing spinal or epidural procedures while seated on a standard labor and delivery, operating room or other table or bed is described. An exemplary embodiment of the device includes an upper body support tray and a foot support tray which are independently adjustable along the length of an extendable pole assembly. The pole also connects to a base which provides a stable support and slides under the bulky support bases which are a part of modern hospital beds used in labor and delivery and operating rooms.

19 Claims, 5 Drawing Sheets

DEVICE FOR POSITIONING THE SITTING PATIENT FOR EPIDURAL OR SPINAL INJECTION PROCEDURES

CROSS-REFERENCE TO RELATED APPLICATIONS

This is a continuation-in-part of, and claims priority under 35 USC Section 120 from application Ser. No. 12/586,815, filed Sep. 29, 2009 now abandoned, the entire contents of which are incorporated herein by this reference.

BACKGROUND

The current discussion is focused on a device to facilitate proper positioning of the sitting patient for epidural or spinal injection procedures, for example, to facilitate proper positioning of the pregnant patient in the sitting position for placement of an epidural and/or spinal anesthetic.

Epidural and/or spinal puncture or injection is a medical technique whereby therapeutic substances and catheters are introduced through a needle into the epidural or spinal spaces through the tissues of the back.

The procedure is most commonly performed in the lower (lumbar) spine by anesthesiologists in order to relieve pain in pregnant women laboring during childbirth. The procedure can also be used at other spinal levels and for such varied indications as to administer anesthesia for surgical procedures and to treat chronic pain conditions.

To perform epidural or spinal injection, the patient must first be positioned sitting on a standard hospital bed or other platform so that the anesthesiologist has access to the patient's back. The anesthesiologist can then place the epidural needle through skin and deep tissue layers in the back, between the bones of the spine, and into the epidural or spinal space as desired. Improper position or patient movement during this procedure can cause both technical difficulty in accomplishing the procedure, and injury to the patient.

Standard references in Anesthesiology (eg.: Benumof J. L. et al., *Clinical Procedures in Anesthesia and Intensive Care.* 1992 J.B. Lippincott Co, pg 655-656) recommend positioning the sitting patient for epidural or spinal anesthesia by having the patient sit 'at the midpoint of the operating table with legs over the side edge, knees bent, and feet supported by a stool' and having the patient 'lean forward on an assistant or other suitable support.'.

The direction to 'lean forward' can actually be counterproductive to proper patient positioning. Most patients respond to the instruction to lean forward by flexing forward from the hips, rather than forward flexing the curve of their spine. This is particularly problematic in pregnant patients in labor, where the ability to forward flex the lumbar spine is reduced due to mechanical interference from the large size of the pregnant uterus.

Anesthesiologists use a variety of makeshift methods to position patients for sitting epidural or spinal procedures. Most patients are positioned by simply sitting up in their hospital bed, hanging their legs over the side of the bed, and leaning forward on a nurse or other assistant, who stands in front of the patient and allows the patient to lean on their shoulder. In the case of laboring pregnant patients, this support is frequently provided by an untrained family member. Most commonly the recommendation that the feet be supported on a stool is ignored.

Makeshift support methods and/or devices cause problems for the patient, for the support person, and for the anesthesiologist.

For the patient, the effect of makeshift support methods and devices is that patients are uncomfortable, unable to position themselves properly, and unable to prevent themselves from moving unpredictably. They are thereby unnecessarily exposed to the risks of discomfort and neurologic or other medically significant injury during the procedure.

When a support person is used to help position the patient, both the patient and the support person are at risk of injury.

A medically untrained support person may unexpectedly become unable to provide the required support during the procedure. This can lead to falls or other injuries to both the support person and the patient.

When a trained support person is used, this generally means that the patient's labor and delivery nurse is occupied with providing the required mechanical support, and therefore is distracted from other important duties such as ongoing continuous maternal and fetal monitoring, and also is unable to provide immediate treatment if an important medical event should occur.

For the anesthesiologist performing the procedure, makeshift support methods dictate that the procedure must be performed at a working height determined by the height of the support person, or if a stool is used to support the feet, by the height of the stool. These limitations force the anesthesiologist to work in an uncomfortable or awkward position, thereby making the procedure more difficult and hazardous than necessary.

To be useful in pregnant patients, a device should be compatible with the specific anatomy and needs of the laboring pregnant patient and her fetus. In labor, important, dangerous, and potentially fatal medical events may occur within seconds, as in the case of a maternal seizure during placement of a labor epidural, or minutes, as when fetal distress may be indicated by a deteriorating fetal heart rate tracing. Continuous and unencumbered access to the patient for the purposes of both fetal and maternal monitoring and possible emergency treatment should be assured at all times in order to avoid patient harm and consequent legal liability. Any device used to support a pregnant patient during any procedure is preferably also configured to allow it to be easily and rapidly disengaged to allow immediate re-positioning of the patient in to 'normal' labor and delivery posture on the standard labor and delivery bed.

DRAWINGS

DETAILED DESCRIPTION

This description refers to the accompanying drawings FIGS. 1 through 5 representing one possible embodiment of the device, and method of use. It is nevertheless understood that no limitation of the scope of the invention is intended.

The device and positioning methods described herein may provide safe and effective patient positioning and forward flexion of the lumbar spine for epidural and spinal puncture procedures.

There are two components to the desired position for epidural or spinal punctures. The most important component is the forward flexion of the lumbar spine. Proper forward flexion provides the maximum separation between the bony spinous processes and allows the advancing needle access to the epidural space without encountering bony resistance. Of secondary importance is the 'leaning forward' accomplished by hip flexion. This hip flexion component of 'leaning forward' is to allow the patient to achieve a balanced position supported by the device.

Figure 1:
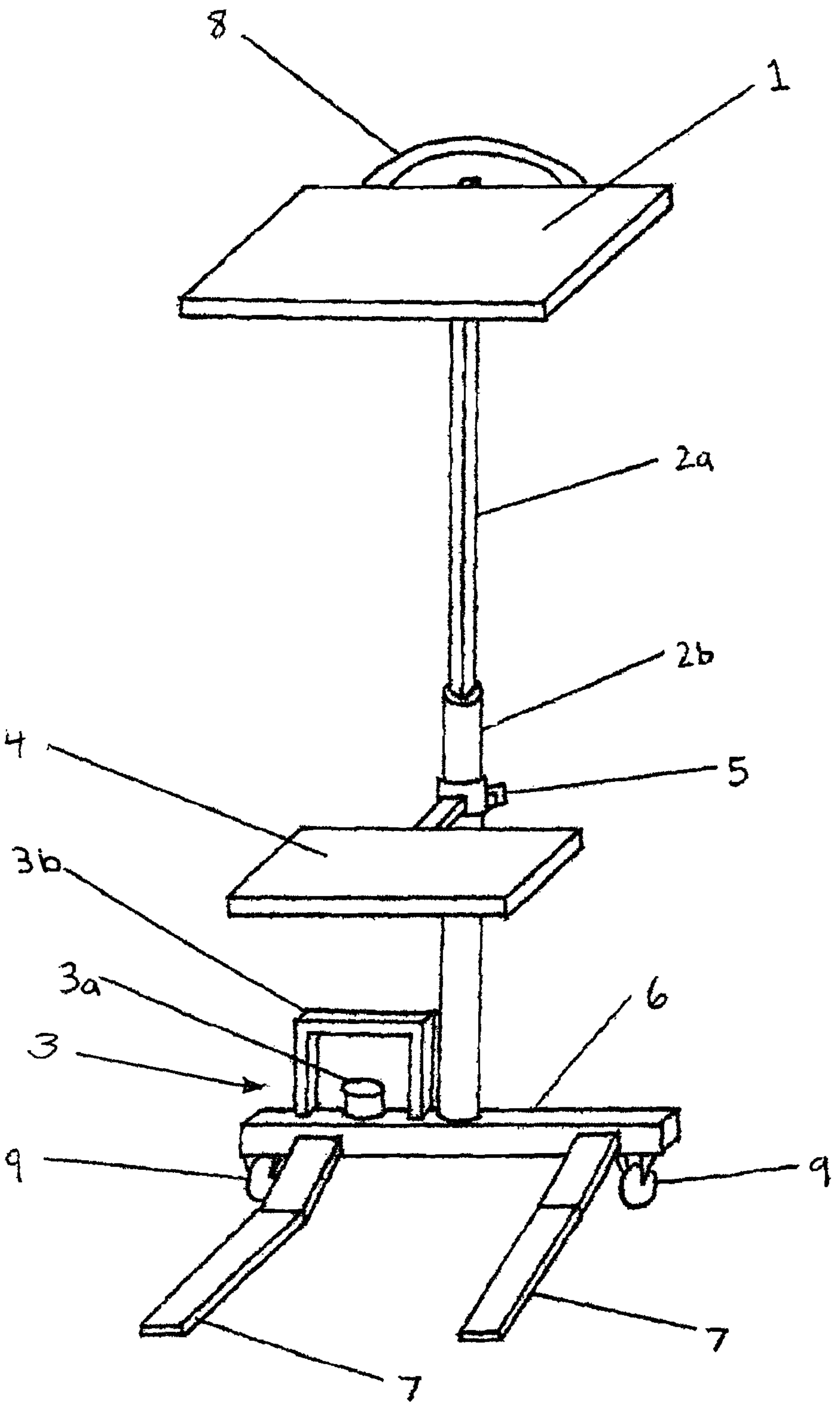
FIG. 1 is an oblique view from above showing an exemplary embodiment of the device.

FIG. 1 is a diagrammatic view illustrating an exemplary embodiment of a device for positioning a sitting patient for an epidural or spinal puncture procedure. The exemplary device includes an upper body support structure or tray (1), an extendable or height-adjustable support structure (2) such as a pole assembly including upper and lower segments (2*a*, 2*b*), an adjustment mechanism (3) for adjusting and fixing the height of the support structure (2), a foot rest support structure or tray (4), and a base structure 6) supporting the support structure (2). The heights of the upper body support tray (1) and foot support tray (4) are independently adjustable to allow appropriate fit to different sized patients. The exemplary embodiment is a stand-alone device which may be moved from patient care location to location.

Still referring to FIG. 1, this view shows the upper body support structure or tray (1) mounted to the top of the upper segment (2*a*) of the extendable pole assembly (2). The tray (1) may be mounted adjacent to or at the top of the upper segment by a bracket or other attachment structure for fixedly attaching the tray (1) to the upper segment (2*a*) and preventing rotational or linear movement of the tray relative to the upper segment when supporting the upper body and arms of the patient. In this embodiment, the upper body support tray (1) extends approximately perpendicular to the extendable pole assembly (2). The upper body support tray (1) in this embodiment is of a size appropriate to provide a supportive surface to a patient's upper body and arms. Its dimensions relative to the foot support tray (4) are further discussed below, specifically with reference to the relative length of the two trays. In the exemplary illustrated embodiment, the dimensions of the upper body support tray are: length, extending from the extendable pole assembly to the edge of the tray closest to the patient in the position of use; 22 inches, and width 14 inches. For other embodiments, trays of different sizes may be used.

The upper (2*a*) and lower (2*b*) segments of the extendable pole assembly (2) may be telescoping tubes or similar structures which slide relative to one another to provide for the proper adjustment of the total length of the extendable pole assembly (2) and therefore the height of the attached upper body support tray (1) above the floor. While the exemplary embodiment utilizes a single pole assembly as the support structure (2), alternate embodiments may use a dual telescoping pole frame structure to adjust and fix the height of the tray (1) to a selected position, or other type of adjustable height supports.

The upper (2*a*) and lower (2*b*) segments are normally locked in position by a mechanism (3) or first means, typically incorporated within the interior of the extendable pole assembly (interior not shown). This mechanism (3) may be any one of a number of suitable mechanisms, utilizing for example wedge, cam plate or other type of locking elements which automatically maintains the position of the upper segment to the lower segment in a locked condition, and is released by depressing the foot pedal actuator (3*a*) during actual adjustment of the height of the upper body support tray (1). Releasing the foot pedal actuator returns the mechanism to the locked condition. One exemplary mechanism is described in U.S. Pat. No. 3,853,297, the entire contents of which are incorporated herein by this reference. Another example may utilize a pneumatic mechanism to raise and lower the upper segment relative to the lower segment. The means of adjustment may be manual, or powered, e.g. by hydraulic pump or by an electronic motor.

The foot support tray (4) is connected to the lower segment (2*b*) of the extendable pole assembly (2*b*) using a second mechanism or means (5) which allows the foot support tray (4) to be adjusted and secured at the appropriate height. The second means (5) may be any one of a number of available screw, lever actuated or other quick release type clamp elements which may be rapidly and reversibly released and re-secured to the appropriate position on the extendable pole assembly (2). The mechanism of securing the foot support may be a simple clamp or a 'quick release' type of clamp capable of securing the foot support tray at any point along at least a portion of the length of the lower segment of the extendable pole assembly. The mechanism may also be configured to permit detachment of the adjustable foot support structure from the pole assembly, such as a quick release clamp.

The base structure (6) includes a crossbar structure (6*a*) to which the pole assembly (2) is attached in a generally perpendicular vertical configuration, and a pair of flattened support bars (7) protruding from the crossbar structure in a spaced configuration. The support bars extend from the crossbar structure in parallel alignment, and on the same side of the crossbar structure. In other embodiments, the support bars need not be parallel to each other, and may be splayed outwardly. The device has a cantilevered configuration, with the support trays (1) and (4) extending from the pole assembly over the support bars (7). This results in a cantilevered device configuration, such that weight supported by the trays tends to create a tipping force on the device, which is opposed by the support bars to maintain the device in an upright position. The weight supported by the device and supported by the support bars tends to maintain the position of the device, and prevent rolling movement of the device on the wheels (9). This cantilevered configuration may eliminate a need for locking devices to prevent horizontal movement of the device during patient use.

Instead of two support bars, the base structure may include a structure which extends outwardly from the crossbar structure to provide a support base sufficient to support the device against the tipping force applied during patient use. For example, a generally flat planar platform may extend outwardly from the crossbar, instead of spaced bars.

The foot support tray (4) also has minimum appropriate dimensions. The length should be sufficient that when the patient places his/her feet on the support, this downward pressure is transmitted through the cantilevered configuration of the device, which allows downward pressure on the foot support tray (4) and upper body support tray (1) to be transmitted to the flattened support bars (7) of the base structure (6), thus stabilizing the device against sliding away from the patient. Also, the foot support tray (4) is preferably somewhat shorter than the upper body support tray (1). In the illustrated exemplary embodiment, the foot support tray is 4.5 inches shorter than the upper body support tray. This differential insures that when the patient's lower leg is perpendicular to the floor and feet are properly positioned on the foot rest, the patient will be prevented from excessive forward flexion of the hips, by the properly positioned upper body support tray (1).

The foot support tray (4) is preferably also wide enough to allow for patients of different body habitus to be able to properly support their feet on the device. Due to the fact that the fetus descends into the pelvis during labor, pregnant patients are not uniformly able to bring their knees close to the midline and the foot support tray is preferably wide enough to accommodate this reality. In the illustrated embodiment the dimensions of the foot support tray are: length, extending from the extendable pole assembly to the edge of the tray closest to the patient in the position of use; 17.5 inches, and width 17 inches.

Independent adjustment of the upper body support tray (1) and foot support tray (4) allows appropriate fit to different sized patients. The range of adjustment may also allow the anesthesiologist to be either seated or standing during performance of the procedure.

The bottom of the lower segment (2*b*) of the extendable pole assembly (2) is also connected to the base (6) which is designed to provide a stable support. As noted above, the base (6) comprises a cross bar structure to which are attached flattened support bars (7) which extend in a transverse direction relative to the base cross bar, and on the same side of the pole assembly as the upper body support tray and the foot support tray, i.e. the patient-facing or patient side of the pole assembly. The flattened support bars (7) are designed with a length sufficient to provide a stable platform for support of the device when 'loaded' by having the patient place their feet on the foot support tray (4) and their upper body on the upper body support tray (1). The flattening of the support bars also provides sufficient surface area contact with the floor. The flattened support bars (7) may also be coated with a non-slip material such as latex or rubber. The flattened support bars (7) are also designed to slide under the bulky support structures which are a part of the undercarriage of modern hospital beds used in labor and delivery and operating rooms.

In the illustrated embodiment, a handle (8) is shown which allows the device to be easily transported between various patient care locations, by pulling the device in a direction opposite the bars (7), lifting the bars off the floor and wheeling the device to the desired location.

In the illustrated embodiment, a pedal guard (3*b*) protects the foot pedal release (3*a*) of the locking mechanism (3) of the extendable pole assembly (2).

In the illustrated embodiment, wheels (9) are attached to the base (6) in a manner which allows the device to be easily transported between patient care locations by grasping the handle (8), and tilting the device such that it is supported by the wheels (9).

Figure 2:
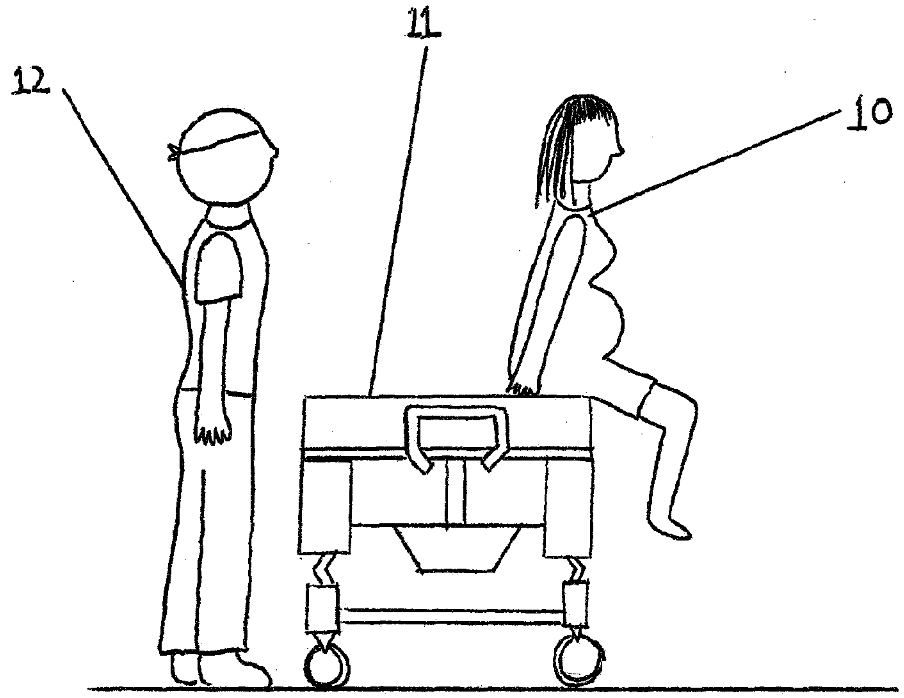
FIGS. 2 through 5 show a typical embodiment of the exemplary embodiment of the device and illustrate the method of use with a pregnant patient sitting on a standard labor and delivery or operating room table. The operator may adjust the height of all components of the device to allow the epidural or spinal puncture to be performed with the operator either sitting or standing.

FIGS. 2 through 5 show the device in use, with the patient (10) in various stages of appropriate positioning in relation to the device, further described in detail below:

In FIG. 2 the patient (10) is shown simply sitting at the edge of a standard labor and delivery or operating room bed (11) with the bed having been adjusted using its built in controls to a working height determined by the anesthesiologist (12).

Figure 3:
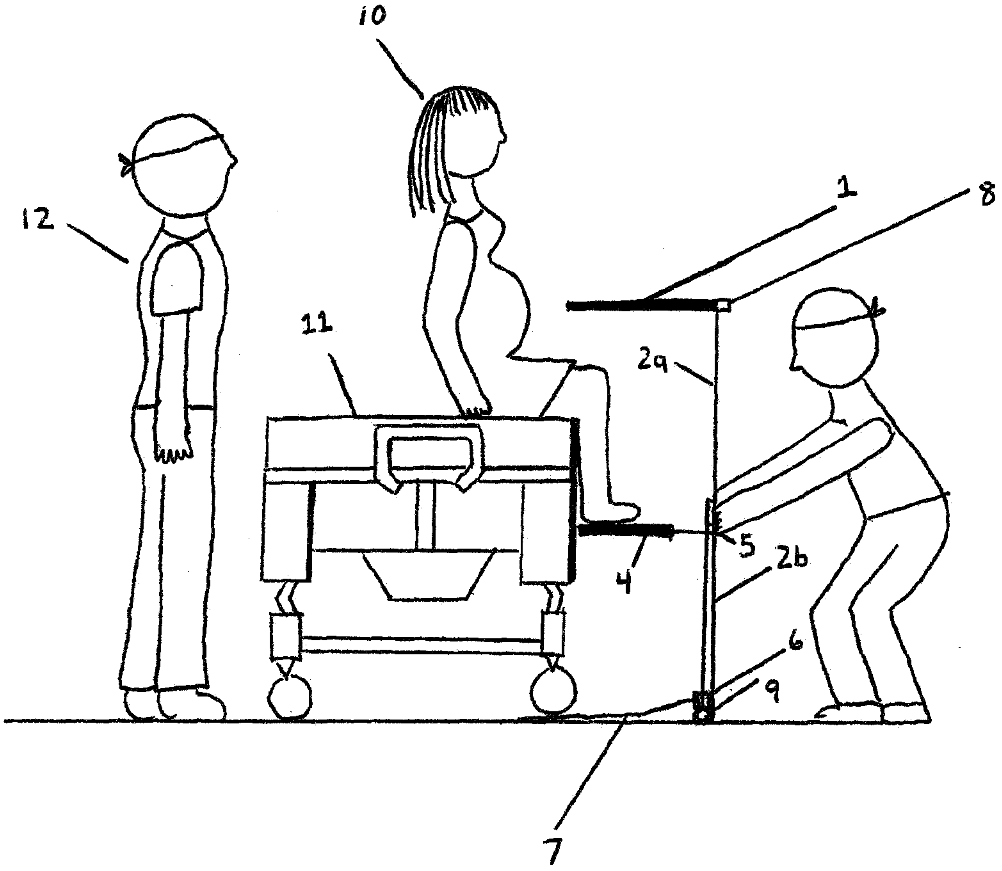

FIG. 3 shows the device moved into position in front of the sitting patient (10), with the feet supported on the foot support tray (4) which has been adjusted to the appropriate height using the second mechanism (5).

Figure 4:
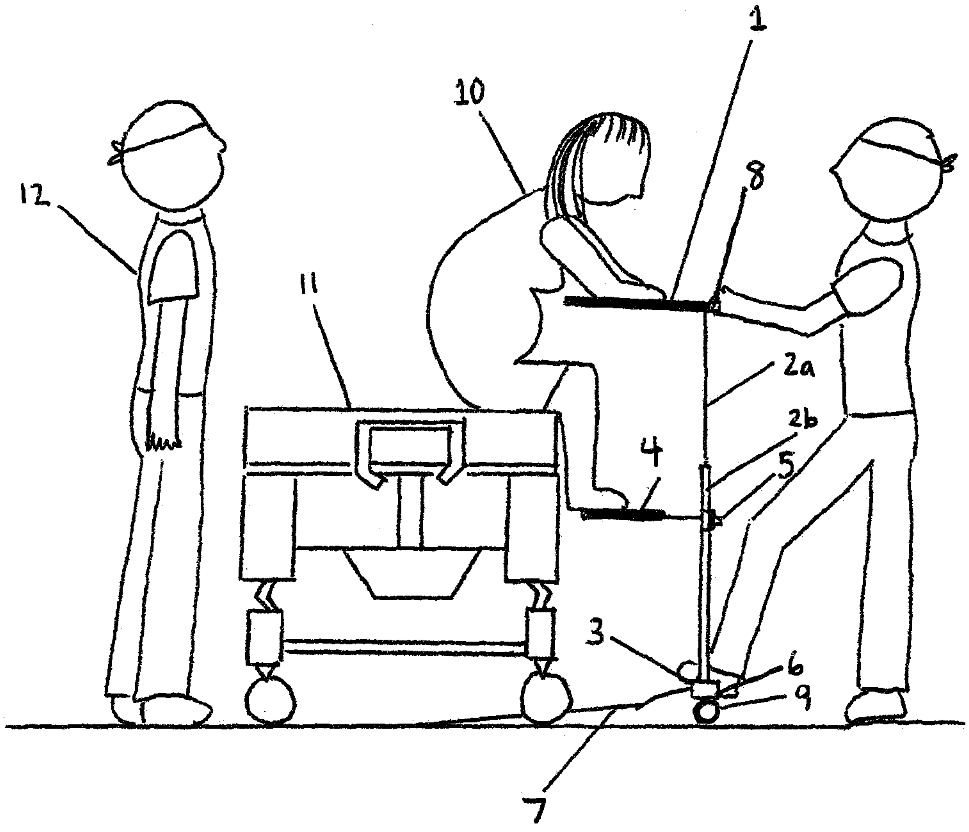

FIG. 4 shows the upper body support tray (1) adjusted to the appropriate height using the first mechanism (3) to support the upper body of the patient (10). The base (6) of the device is slid into position using the wheels (9) so that the flattened support bars (7) lie under the undercarriage of the hospital bed (11) and the foot support tray (4) is directly under and supporting the feet of the patient (10).

Figure 5:
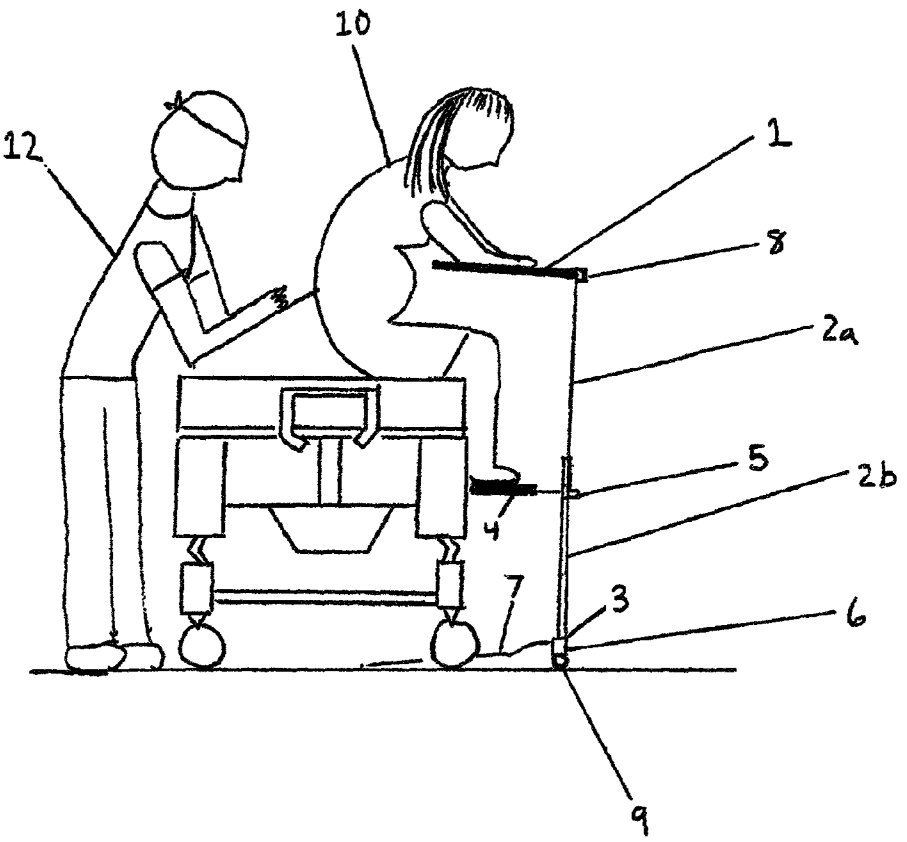

FIG. 5 shows the patient (10) having been instructed by the anesthesiologist (12) to forward flex the spine, or in the most common case of a pregnant patient to 'curve your spine in a circle around the baby'. This instruction will bring the spine into an appropriate curved position, and the height of the upper body support tray (1) may be fine-tuned at this time using the described mechanism (3). The arms may be folded on the upper body support tray (1) and the head rested on the arms and/or a single use sanitary pillow and drape developed for use with the device, or a simple pillow placed on top of the tray.

The anesthesiologist (12) may then perform the epidural procedure by standard techniques.

In the foregoing description certain terms have been used for brevity, clarity and understanding. No limitations are to be implied therefrom, and such terms are used only for descriptive purposes, and are intended to be broadly construed. Moreover the description and illustration of the embodiment is simply one example, and the invention is not limited to the details shown or described.

DRAWINGS

List of Reference Numerals

1) Upper body support tray
2) Extendable pole assembly
2*a*) Upper segment of the extendable pole assembly (2)
2*b*) Lower segment of the extendable pole assembly (2)
3) Locking mechanism for the extendable pole assembly (2)
3*a*) Foot pedal actuator of the locking mechanism of the extendable pole assembly (2)
3*b*) Pedal guard
4) Foot support tray
5) Mechanism to adjust the foot support tray
6) Base of the device
6*a*) Crossbar structure
7) Flattened support bars
8) Handle
9) Wheels
10) Patient
11) Labor and delivery bed/hospital bed
12) Anesthesiologist administering epidural or spinal procedure

What is claimed is:

1. A positioning device to facilitate stable positioning of a laboring, surgical or other patient in the proper sitting position for performance of epidural or spinal procedures, such device comprising:

a. a substantially vertical extendable pole assembly comprising more than one segment, said segments being connected by a first mechanism configured to provide adjustment of the length of the extendable pole assembly, b. an upper body support tray attached to an upper segment of the extendable pole assembly, the upper body support tray extending approximately perpendicular from the extendable pole assembly such that it is maintained in an approximately horizontal relationship with respect to a ground surface, c. an independently adjustable foot support structure whose vertical position is adjustable along at least a portion of a length of a lower segment of the extendable pole assembly by a second mechanism, the foot support structure extending from the extendable pole assembly such that it lays directly below the upper body support tray, d. a base structure connected to the extendable pole assembly and configured to provide a stable base support for the device, the base structure including a crossbar structure and a pair of base support bars extending from the crossbar structure, the pair of base support bars extending from the cross bar structure such that the base support bars lay below the foot support structure and are adapted to allow the pole assembly to be positioned adjacent an operating room and labor and delivery bed with the base support bars adapted to fit beneath bulky undercarriage structures of operating room and labor and delivery beds and to create a freestanding bedside unit; and wherein the upper body tray, the foot support structure and the base support bars extend toward a patient-facing side of the device to provide a cantilevered configuration such that placing a load on the upper body tray and foot support structure forces the support bars against a ground surface to assist in stabilizing the device;

whereby said device is configured to provide patient support in a proper position for performance of epidural or spinal procedures in the sitting position at the patient's bedside.

2. The positioning device of claim 1, wherein said second mechanism is configured to allow adjustment of the foot support structure along at least a portion of the length of the lower segment of the extendable pole assembly and fixing of the foot support structure to a selected position.

3. The adjustable foot support structure of claim 2, wherein said second mechanism is configured to permit detachment of the adjustable foot support structure from the pole assembly.

4. The positioning device of claim 1, further including wheel mechanisms built onto the base to allow the device to be tilted back away from a patient-side of the device and rolled for easy transport between patient care locations.

5. The positioning device of claim 1, further including a handle incorporated in or attached to the pole assembly or upper body support structure to facilitate easy transport of the device between patient care locations.

6. The positioning device of claim 1, wherein the first mechanism includes a foot pedal actuator, to release the first mechanism from a locked condition when the foot pedal is depressed, allowing the pole assembly to be adjusted in length, and the first mechanism automatically locks to fix the length of the pole assembly when the foot pedal actuator is released.

7. The positioning device of claim 1, wherein the foot support structure is a tray that protrudes from the pole assembly by approximately 4.5 inches less-than a distance the upper body support tray protrudes from the pole assembly.

8. The positioning device of claim 1, wherein the base support bars extend from the crossbar structure in a spaced configuration, the base support bars extending transverse to the crossbar structure by a dimension larger than a depth of the upper body support tray.

9. A method of use of the positioning device of claim 1, comprising:

a. adjusting a patient's hospital or other bed to a comfortable working height for an operator, b. adjusting the foot support structure of the device to a height which properly supports the patient's feet at or near a level where the knee is flexed to approximately 90 degrees, c. placing the patient's feet on the foot support structure, d. adjusting of the upper body support tray of the device to support the patient in a proper forward flexed position for the procedure, e. curving the upper body of the patient forward on to the upper body support tray, whereby the patient can be placed and maintained comfortably and safely in the proper position for performance of epidural or spinal procedures in the sitting position.

10. A positioning device to facilitate stable positioning of a laboring, surgical or other patient in the proper sitting position for performance of epidural or spinal procedures, such device comprising:

a mobile base structure including a crossbar structure and a pair of transverse support bars, the support bars extending from the crossbar structure toward a patient-facing side of the device;

an adjustable-length extendable pole assembly having a first end portion connected to the base structure and extending in a generally vertical direction when the device is at rest on a floor;

an upper body support structure attached to the extendable pole assembly for adjustable vertical positioning, the upper body support structure extending approximately perpendicular from the extendable pole assembly such that it is maintained in an approximately horizontal relationship with respect to a ground surface when the device is at rest on a floor;

an independently adjustable foot support structure attached to the extendable pole assembly such that the foot support structure lays directly below the upper body support structure at a vertical position which is independently adjustable along at least a portion of a length of a lower segment of the extendable pole assembly relative to positioning of the upper body support structure;

wherein the device has a cantilevered configuration in which the upper body support structure and the foot support structure extend over the pair of transverse support bars on a patient-facing side of the device, the base structure providing a stable support of the device, the base structure configured to allow the extendable pole assembly to be positioned adjacent an operating room, labor or delivery bed with at least a portion of the base structure fitting beneath an undercarriage structure of the bed.

11. The positioning device of claim 1, wherein the foot support structure extends from the extendable pole assembly such that it is approximately perpendicular to the extendable pole assembly and such that it is maintained in an approximately horizontal relationship with respect to a ground surface.

12. The positioning device of claim 11, wherein both the upper body support tray and the foot support structure are substantially planar.

13. The positioning device of claim 10, wherein the mobile base structure includes a wheel mechanism to allow the device to be tilted slightly back and rolled for easy transport between patient care locations.

14. The positioning device of claim 10, further including a handle attached to the extendable pole assembly or upper body support structure to facilitate easy transport of the device between patient care locations.

15. The positioning device of claim 10, further comprising a first mechanism that includes a foot pedal actuator, the food pedal actuator adapted to release the first mechanism from a locked condition when the foot pedal is depressed, allowing the extendable pole assembly to be adjusted in length, and the first mechanism automatically locks to fix the length of the extendable pole assembly when the foot pedal actuator is released.

16. The positioning device of claim 10, further comprising a second mechanism that is configured to allow adjustment of the foot support structure along at least a portion of the length of the lower segment of the extendable pole assembly and fixing of the foot support structure to a selected position.

17. The positioning device of claim 10, wherein the foot support structure is a tray that protrudes from the extendable pole assembly by approximately 4.5 inches less than a distance the upper body support tray protrudes from the extendable pole assembly.

18. The positioning device of claim 10, wherein the base structure includes a crossbar structure and a pair of base support bars extending from the crossbar structure in a spaced configuration, the base support bars extending from the crossbar structure and toward the patient-facing side of the device by a dimension larger than a depth of the upper body support tray.

19. The positioning device of claim 1, wherein both the upper body support tray and the foot support structure are substantially planar.

* * * * *